(12) United States Patent
Papleux (10) Patent No.: US 11,171,829 B2
(45) Date of Patent: *Nov. 9, 2021

(54) PLATFORM FOR RAPID PROTOTYPING OF INTERNET-ENABLED DEVICES

(71) Applicant: Accenture Global Solutions Limited, Dublin (IE)

(72) Inventor: Fabien Papleux, Celebration, FL (US)

(73) Assignee: Accenture Global Solutions Limited, Dublin (IE)

( * ) Notice: Subject to any disclaimer, the term of this patent is extended or adjusted under 35 U.S.C. 154(b) by 2 days.

This patent is subject to a terminal disclaimer.

(21) Appl. No.: 16/675,345

(22) Filed: Nov. 6, 2019

(65) Prior Publication Data

US 2020/0076688 A1 Mar. 5, 2020

Related U.S. Application Data

(63) Continuation of application No. 15/453,209, filed on Mar. 8, 2017, now Pat. No. 10,484,237.

(60) Provisional application No. 62/307,930, filed on Mar. 14, 2016.

(51) Int. Cl.
*G06F 15/177* (2006.01)
*H04L 12/24* (2006.01)
*H04L 29/08* (2006.01)

(52) U.S. Cl.
CPC ...... *H04L 41/0806* (2013.01); *H04L 41/0853* (2013.01); *H04L 67/04* (2013.01); *H04L 67/12* (2013.01); *H04L 67/28* (2013.01)

(58) Field of Classification Search
CPC . H04L 41/0806; H04L 41/0853; H04L 67/28; H04L 67/04; H04L 67/12
See application file for complete search history.

(56) References Cited

U.S. PATENT DOCUMENTS

| 8,379,613 | B2 | 2/2013 | Foxworthy |
| 10,054,922 | B2 | 8/2018 | Kallio et al. |
| 2006/0100002 | A1 | 5/2006 | Luebke |

(Continued)

OTHER PUBLICATIONS

'developer.ibm.com' [online]. "Node-Red," Feb. 8, 2017, [Retrieved on Aug. 28, 2017], Retrieved on the Internet: URL < https://developer.ibm.com/code/open/node-red/ >, 3 pages.

(Continued)

*Primary Examiner* — Anh Nguyen
(74) *Attorney, Agent, or Firm* — Fish & Richardson P.C.

(57) ABSTRACT

Methods, systems, and apparatus, including computer programs encoded on computer storage media, for prototyping Internet-enabled devices. One of the methods includes receiving a prototype program defining functionality of a proposed Internet-enabled device having a plurality of sensors and one or more actuators. A sensor hub receives a registration request through a prototyping API for each of the connected sensors and the one or more actuators. The sensor hub initializes each of the connected sensors and the one or more connected actuators, obtains a status of each registered connected sensor, provides the obtained status of each connected sensor to the prototyping system through the prototyping API, receives requested actions corresponding to functionality specified in the prototype program, and executes each of the requested actions on a corresponding connected actuator.

18 Claims, 3 Drawing Sheets

(56) References Cited

U.S. PATENT DOCUMENTS

| | | | |
|---|---|---|---|
| 2010/0083356 | A1 | 4/2010 | Steckley |
| 2011/0085525 | A1 | 4/2011 | Patini |
| 2013/0169407 | A1 | 7/2013 | Chen et al. |
| 2014/0379098 | A1 | 12/2014 | Masten et al. |
| 2015/0082306 | A1 | 3/2015 | Shin et al. |
| 2015/0222517 | A1 | 8/2015 | McLaughlin |
| 2015/0367738 | A1 | 12/2015 | Saitou et al. |
| 2016/0021482 | A1 | 1/2016 | Kumar et al. |
| 2016/0255066 | A1* | 9/2016 | Green .................. H04L 67/10 726/4 |
| 2016/0371957 | A1* | 12/2016 | Ghaffari .............. G01M 3/2807 |

OTHER PUBLICATIONS

AU Office Action for Application No. 2017201679, dated Aug. 15, 2018, 5 pages.
AU Office Action for Application No. 2017201679, dated Feb. 12, 2018, 5 pages.
AU Office Action for Application No. 2017201679, dated Jun. 5, 2018, 7 pages.
AU Office Action for Application No. 2017201679, dated Aug. 17, 2017, 8 pages.
Karagiannis V., "Building a Testbed for the Internet of Things," Bachelor of Science Thesis, Barcelona, Apr. 1, 2014, Viewed on the Internet on Aug. 14, 2017, Retrieved from <URL: https://s3.amazonaws.com/academia.edu.documents/41907576/THESIS_Karagiannis_Vasileios.pdf?AWSAccessKeyId=AKIAIWOWYYGZ2Y53UL3A&Expires=1510853625&Signature=rExQKjY%2Bo3buP6zcWBsCyE8h%2BA0%D&response-content-disposition=inline%3B%20filename%3DBuilding_a_Testbed_for_the_Internet_of_T.pdf>, pp. 1-92.
Mahkonen et al., "Demo: Secure M2M Cloud Testbed," Proceedings of the 19th annual international conference on Mobile computing & networking, MobiCom'13 Miami Florida USA Sep. 30-Oct. 4, 2013, ISBN: 978-1-4503-1999-7 ACM New York, USA 2013, 4 pages.
Sanchez et al., "SmartSantander. IoT Experimentation over a Smart City Testbed," Elsevier Science Direct, vol. 61, Mar. 14, 2014, 29 Pages.

* cited by examiner

PLATFORM FOR RAPID PROTOTYPING OF INTERNET-ENABLED DEVICES

CROSS-REFERENCE TO RELATED APPLICATION

This application is a continuation of U.S. application Ser. No. 15/453,209, filed Mar. 8, 2017, which claims the benefit of U.S. Provisional Application No. 62/307,930, filed Mar. 14, 2016. Both of these prior applications are incorporated by reference in their entirety.

BACKGROUND

This specification relates to Internet-enabled devices.

An Internet-enabled device is a device having embedded software and electronics configured to communicate with sensors and actuators, and to exchange data related to the operation of those sensors and actuators over a network, e.g., the Internet. For brevity, such devices may be referred to as "Internet of Things" devices (IoT devices). However, such devices can communicate information on any appropriate network, which need not be the Internet.

IoT devices have interactive functionalities that have myriad applications in many industries. For example, IoT devices have applications in building design where they can be used to monitor lighting or heating in a building; healthcare where they can provide remote monitoring capabilities, e.g., for blood pressure or heart rate monitoring; and transportation where they can control speed limits or monitor vehicle speeds.

Building prototypes of IoT devices can be expensive due to the multiple different physical components that are involved. Different sensors and actuators may use different communication protocols. Furthermore, building, testing, and integrating systems having embedded software is an expensive and time-consuming process.

SUMMARY

This specification describes a system that provides a platform for rapidly prototyping proposed Internet-enabled devices.

Particular embodiments of the subject matter described in this specification can be implemented so as to realize one or more of the following advantages. Developers can quickly and cheaply demonstrate a proof of concept for proposed IoT devices. Developers need not write embedded software from scratch in order to build a prototype IoT device. Developers can easily add support for new sensors and actuators by simply writing a module that provides device-level services for the new sensor or actuator. Developers can quickly reuse logic developed once for many applications.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that provides a platform for rapidly prototyping the functionality of Internet-enabled devices. The system allows proposed functioning IoT devices to be demonstrated relatively quickly and relatively cheaply.

Rather than requiring hardware integration and embedded software development, the system allows the proposed IoT device to be designed and tested using a platform that provides an emulated environment for components of the system, an environment that uses the actual physical sensors that would be integrated into the proposed IoT device.

Figure 1:
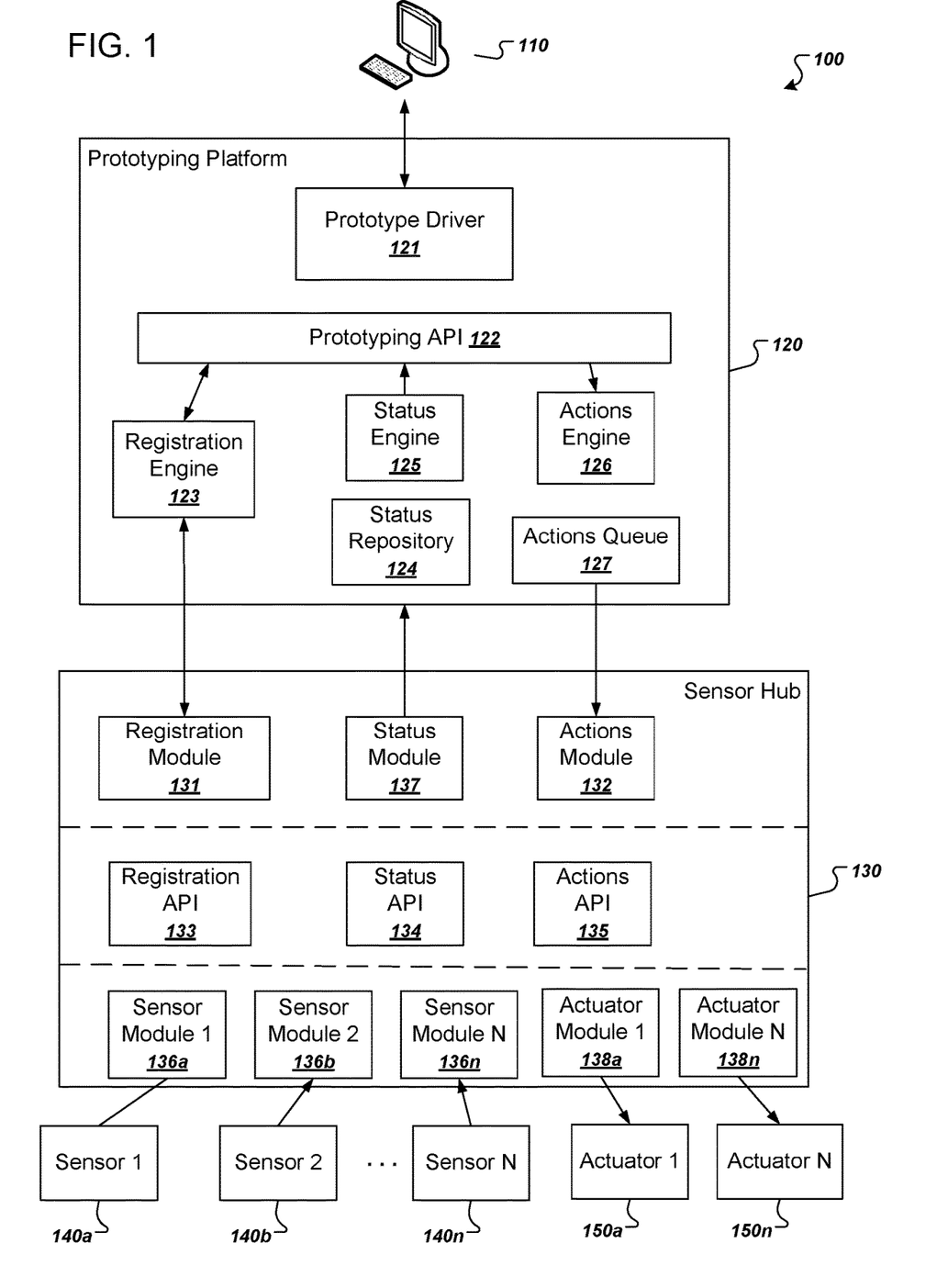
FIG. 1 is a diagram of an example system.

FIG. 1 is a diagram of an example system 100. The system 100 includes a user device 110, a prototyping platform 120, a sensor hub 130, multiple sensors 140a-n, and multiple actuators 150a-n.

To prototype a proposed IoT device using the system 100, a user can connect one or more sensors 140a-n and/or one or more actuators 150a-n to a sensor hub 130. In this specification, a sensor refers to any appropriate device capable of receiving an input and transforming the input into either a digital representation or a low voltage signal that can be detected by the sensor hub 130. Common sensors include digital thermometers, humidity sensors, light sensors, soil moisture sensors, distance gauges, and global positioning satellite (GPS) receivers, to name just a few examples. Sensors can also include physical control mechanisms, including buttons, switches, or sliders, to name just a few examples.

In this specification, an actuator refers to any appropriate device capable of executing an action in response to receiving a signal or a command. Common actuators include lights, relays, displays, or physically moving parts. Some devices may be both sensors and actuators. For example, a camera can receive a command to take a picture and, in response, obtain a digital image in a digital representation. In addition, some sensors and actuators may be integrated on a same physical device.

The sensor hub 130 is a computing device having a variety of physical ports for connecting multiple kinds of sensors 140a-n and actuators 150a-n. Typically, the sensors 140a-n and actuators 150a-n are connected to the sensor hub 130 locally by wires that are connected directly to the sensor hub 130, although short-range wireless communications, e.g., Zigbee, Z-Wave, RFID, or Bluetooth, can also be used.

The prototyping platform 120 is a computing system that executes a number of software modules. For example, the prototyping platform 120 can be implemented on a server that is in communication with the user device 110 over a network. Alternatively, the prototyping platform 120 can be installed in whole or in part on the user device 110. Thus, both the user device 110 and the prototyping platform can be implemented as any appropriate computing device, e.g., including, but not limited to, a desktop computer, a laptop computer, a tablet computer, a handheld computer, a personal digital assistant (PDA), a cellular telephone, a network appliance, a smart phone, or a combination of any two or more of these data processing devices or other data processing devices. In some implementations, the prototyping platform 120 is implemented as a cloud-based service that executes on one or more computers of a cloud computing platform.

Typically the sensor hub 130 communicates with the prototyping platform 120 over an appropriate communications network. Alternatively, the sensor hub 130 and the prototyping platform 120 can be installed on a same computing device.

After the requisite sensors and actuators for the proposed IoT device are connected to the sensor hub 130, a user of the user device 110 can generate an IoT device prototype by simply providing a prototype program to a prototype driver 121 of the prototyping platform 120. The prototype program is a definition of the functionality of the proposed IoT device. For example, the prototype program can be specified using any appropriate programming language, e.g., Java, Javascript or Python. Alternatively or in addition, the prototype program can be specified using a data definition language, e.g., JSON or XML.

The prototype driver 121 is a module that translates the prototype program into commands, at least some of which utilize a prototyping API 122. An application programming interface (API) is an interface that provides interactivity between software modules. An API allows one software component to request access to services that are implemented by another software component. An API defines the language and parameters that API-calling software modules use when accessing the services that have been implemented by software modules implementing the services of the API. Thus, the prototyping API 122 can be implemented as one or more software modules that are accessed by the prototype driver 121 and each of the modules implementing the services, e.g., the registration engine 123, the status engine 125, and the actions engine 126.

The prototype driver 121 can be implemented using an event orchestration platform that allows a user to define the prototype program as a network of functional modules with corresponding definitions for how the modules interact. For example, an event orchestration platform can provide a graphical user interface to user device 110 that allows a user to graphically design the structure and functionality of the prototype program. A suitable event orchestration platform is the Node-RED event orchestration platform available from IBM Corporation of Armonk, N.Y.

The prototyping API 122 provides access to three basic services for use by prototype programs executed by the prototype driver 121: device registration, obtaining device status, and providing device commands. These services allow a user to rapidly prototype an IoT device by manipulating and interacting with the various sensors and actuators connected to the sensor hub 130.

The registration engine 123 is a module that implements registration of sensor hubs, sensors, and actuators. The registration engine 123 receives requests to register a sensor or actuator through the prototyping API 122, and in response, the registration engine 123 communicates with the sensor hub 130 to register the appropriate sensor or actuator. Registration of a sensor or actuator binds the physical device to an identifier for use by the prototype program.

During the registration process, the registration engine 123 may first perform a discovery process in which the registration engine 123 requests from the sensor hub 130 a list of all connected sensors and actuators. The registration engine 123 can also obtain from the sensor hub 130 a list of available sensor inputs or available actuator actions from each of the connected sensors and actuators. Registration may also cause the sensor hub 130 to perform initial startup tasks, e.g., booting and initializing the appropriate sensor or actuator.

The status engine 125 is a module that manages the status of registered sensors and actuators. In this context, status may refer to a current liveness of a sensor or actuator, e.g., whether the device is on or off; a representation of an input detected by a sensor; or both. For example, a status of a temperature sensor can indicate that the temperature sensor is active, that the current temperature is 50 degrees, or both.

The status engine 125 receives status updates that are automatically provided by the sensor hub 130 and stores the updates in a status repository 124. The status engine 125 also receives requests for the status of sensors and actuators through the prototyping API 122. The status engine 125 can then obtain the requested status from the status repository 124 and provide the obtained status in response to the request.

The actions engine 126 is a module that provides actions to be performed by actuators 150a-n attached to the sensor hub 130. The actions engine 126 receives actions through the prototyping API 122. The actions engine 126 places the received actions in an actions queue 127 to be accessed by the sensor hub 130. The sensor hub 130 then obtains actions from the actions queue 127 either periodically by polling the queue, or on demand by receiving orders directly from the platform, and executes the requested actions in the sequence indicated by the actions queue 127. Actions can also expire or be cancelled by the prototyping platform 120 at any time.

The actions engine 126 can also perform other actions as directed by the prototype program that do not involve actuators of the sensor hub 130. For example, the actions engine 126 can also perform actions that make use of external API services published by third-parties. Thus, in response to a particular received status, the actions engine 126 can provide a command to an external API that is not part of the sensor hub.

As one example, the system 100 can be used to rapidly prototype an Internet-enabled shipping container notification device. To do so, a user can define a prototype program that specifies that if a received status indicates that a light sensor of the sensor hub detects light, that the actions engine 126 should send a notification through an external API. For example, the notification sent through the external API can be in the form of an email message, a text message, or a microblog post.

As another example, the system 100 can be used to rapidly prototype an Internet-enabled shopping device. To do so, a user can define a prototype program that specifies that if a received status indicates that a button has been pushed on the sensor hub, that the actions engine 126 should use an external API to conduct an online purchase a particular product. This kind of dedicated Internet-enabled shopping device can be used to order refills of commonly ordered household items.

The status engine 125, the actions engine 126, or both, can be implemented using a lightweight message broker. A message broker can allow the sensor hub 130 to publish statuses and allows the prototype driver 121 to subscribe to received status updates. Similarly, a message broker can allow the prototype driver 121 to publish actions and allows the sensor hub 130 to subscribe to new actions in the actions queue 127. For example, the status engine 125, the action engine 126, or both can be implemented as an MQ Telemetry Transport message broker.

The sensor hub 130 carries out the functionality of the prototype IoT device by interacting directly with the connected sensors 140a-n and actuators 150a-n. The sensor hub 130 uses one or more APIs that provide access to device-level services for devices connected to the sensor hub 130. The APIs include a registration API 133, a status API 134, and an actions API 135.

The API services are implemented by a corresponding module providing access to the functions implemented by the sensor or actuator. For example, sensor module 1 136a implements device-level services for sensor 1 140a, sensor module 2 136b implements device-level services for sensor 2 140b, sensor module N 136n implements device-level services for sensor N 140n, actuator module 1 138a implements device-level services for actuator 1 150a, and actuator module N 138n implements device-level services for actuator N 150n. There need not be a one-to-one relationship between sensor modules and sensors or actuator modules and actuators. For example, some sensor modules can control and receive data from multiple sensors, and some actuator modules can control and provide data to multiple actuators.

This architecture provides for the efficient connection of many different kinds of sensors and actuators to the sensor hub 130. In order to provide support for a new type of sensor or actuator, a system developer needs only to write or obtain a new sensor or actuator module that implements the device-level services for that sensor or actuator. Afterwards, the developer can immediately leverage the overall prototyping functionality of the system as before.

The registration API 133 provides access to device-level registration services, e.g., discovery, booting, and initialization. The registration API 133 is called by a registration module 131, which receives registration-related requests from the prototyping platform 120. For example, if the registration module 131 receives a request to discover all connected devices, the registration module 131 provides requests through the registration API 133 to each of the individual sensor modules 136a-n and actuator modules 138a-n.

The status API 134 provides access to device-level status services, e.g., obtaining a status of a device. A status module 137 routinely requests status through the status API 134 from each of the individual sensor modules 136a-n and actuator modules 138a-n. The status module 137 then routinely and automatically communicates the received statuses to the prototyping platform 120. For example, when received by the prototyping platform, the status engine 125 can store the received statuses in the status repository 124.

The actions API 135 process access to device-level action services, e.g., instructing a device to perform a particular action. An actions module 132 routinely reads actions from the actions queue 127 and processes the actions in order according to the queue. For each action, the actions module 132 provides a request through the actions API 135 for a corresponding actuator to perform the action. The actions module 132 can then receive through the actions API 135 an indication of the result of the requested action and provide the result to the prototyping platform 120.

Figure 2:
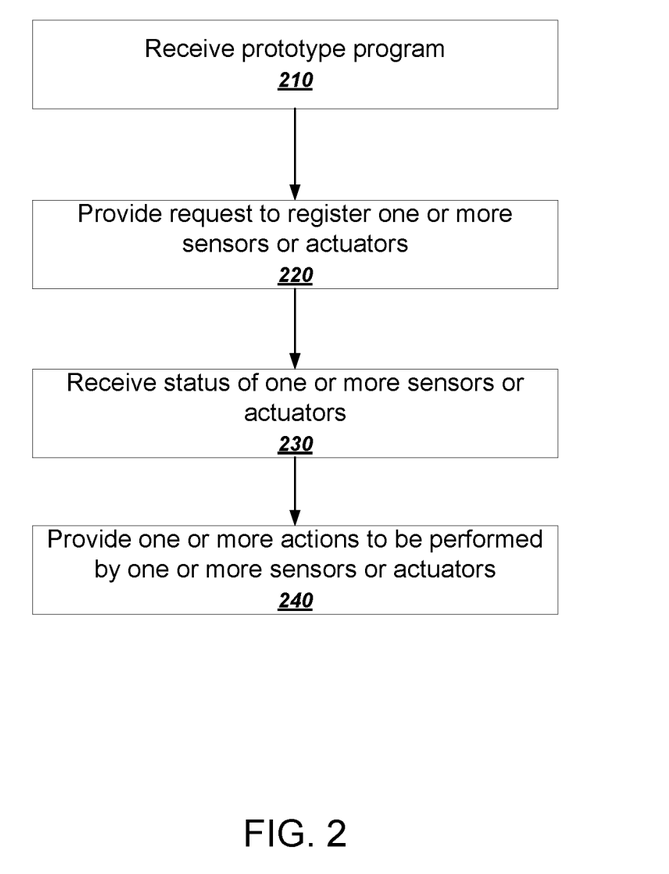
FIG. 2 is a flow chart of an example process for prototyping an IoT device.

FIG. 2 is a flow chart of an example process for prototyping an IoT device. The process can be performed by a computer system having one or more computers, e.g. the prototyping platform 120 of FIG. 1. The process will be described as being performed by a system or one or more computers.

The system receives a prototype program (210). The prototype program contains a definition of the functionality of a proposed IoT device. The prototype program will use a prototyping API of the prototyping platform in order to interact with one or more sensors or actuators connected to a sensor hub. For instance, a prototype program may implement a function aiming at turning on a light when a motion is detected through a motion sensor connected to a sensor hub, e.g., the sensor hub 130 of FIG. 1. The prototype program will listen to the status API until motion is reported, and will then interact with the actions API to trigger the light actuator.

The system can then translate the prototype program into executable commands that use the prototyping API of the prototyping platform. In particular, the executable commands can cause the system to make requests to a sensor hub to register devices, obtain statuses for sensors, and execute actions by actuators.

The system provides a request to register one or more sensors or actuators (220). The system can first provide a request through the prototyping API for a list of all available sensors and actuators. The modules implementing the request then communicate with a sensor hub to which the sensors and actuators are physically connected. The system then requests registration of one or more sensors or actuators using the prototyping API as specified by the prototype program.

The sensor hub responds with identifying information for each of the registered sensors or actuators. The system can then use the identifying information to further interact with the connected sensors and actuators.

The system receives the status of one or more sensors or actuators (230). The sensor hub to which the sensors and actuators are connected can routinely, continuously, or periodically provide the status of the connected sensors and actuators. Upon receiving the statuses, the system can store the status in a status repository for use by the prototype program.

The system provides one or more actions to be performed by the one or more sensors or actuators (240). The prototype program can specify particular actions to be performed by the sensors or actuators. The system can queue the actions according to the time that they were received, and the sensor hub can routinely take actions from the queue in the order in which they were placed.

Through the continual and automatic interaction between the system and the sensor hub, IoT devices can be rapidly prototyped. The statuses of the connected sensors and actuators are automatically pushed to the system, and the sensor hub automatically retrieves actions for the connected devices to perform. In this way, a prototype of a proposed IoT device can be rapidly demonstrated.

Figure 3:
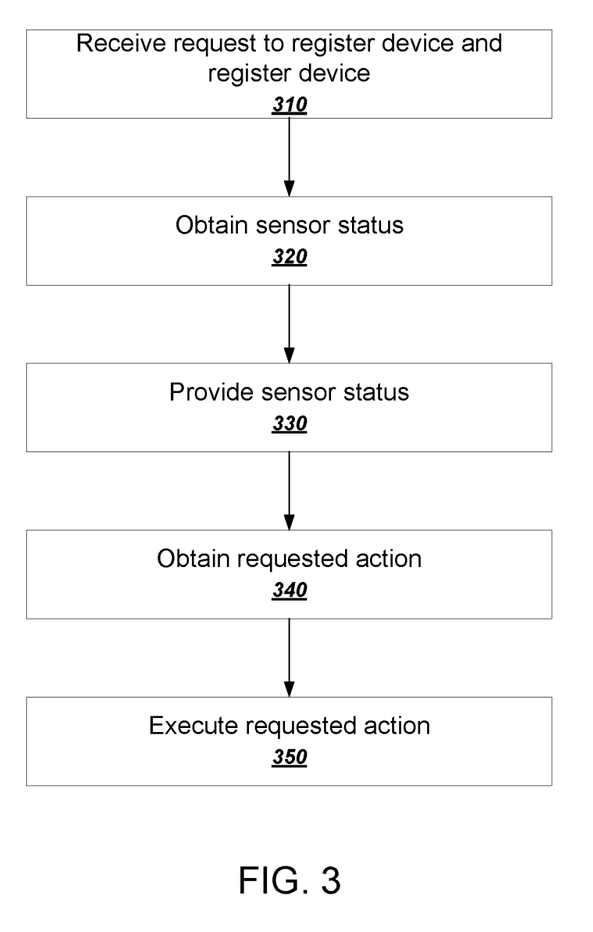
FIG. 3 is a flow chart of an example process for interacting with connected sensors and actuators.

FIG. 3 is a flow chart of an example process for interacting with connected sensors and actuators. The process can be performed by a computer system having one or more computers, e.g. the sensor hub 130 of FIG. 1. The process will be described as being performed by a system or one or more computers.

The system receives a request to register a device and the system registers the device (310). For example, the system can receive a request from a prototyping platform to register a particular device.

In response, the system performs any required initialization routines for the requested sensor or actuator and assigns identifying information for the requested sensor or actuator. The system then provides the assigned identifying information in response to receiving the request.

The system can also receive a request to provide a list of all connected sensors and actuators. The system can then obtain identifying information for all connected sensors and actuators and provide a list of all connected sensors and actuators in response to the request.

The system obtains sensor status (320). As described above, the status can include both liveness information and input measured by the sensor. The system can continually obtain sensor status by communicating with individual sensor modules through a status API. The system can then store the received status from each of the registered sensors.

The system provides sensor status (330). The system can periodically provide a prototyping platform with the last-received status from each of the registered sensors. Typically, the system does not wait to receive a request for a status of the registered sensors. Rather, the system can push the requested status to the prototyping platform.

The frequency at which the system provides the sensor status need not correspond to the frequency at which the system receives the sensor status. For example, a sensor may provide an updated status whenever a new measurement is detected, while the system may provide the sensor status to the prototyping platform at regular intervals, e.g., every 1 minute.

The system obtains a requested action (340). For example, the system can regularly pull actions from a queue maintained by a prototyping system. Alternatively, the prototyping system can push actions to the system whenever the actions become available.

The system executes the requested action (350). The system can provide a request for an actuator to execute the requested action through an actions API. The system can then receive a result of the action, which can include an indication of whether the action succeeded or failed. The system can then provide the result of the action back to the prototyping system in response to receiving the requested action.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving, by a prototyping system that emulates an environment to enable testing for a proposed device and that communicates with a sensor hub system that includes a plurality of connected, physical sensors and a plurality of connected, physical actuators, a prototype program that a) defines functionality of the proposed device that is configured to communicate with one or more proposed device sensors and one or more proposed device actuators and b) comprises statements the prototyping system uses to simulate the proposed device by issuing requests to a prototyping application programming interface (API), the prototyping system comprising one or more computers that include at least one processor and at least one memory;

translating, by the prototyping system, at least a first portion of the prototype program into one or more registration requests for registration of one or more of the connected physical sensors that each correspond to one of the one or more proposed device sensors of the proposed device, and registration of one or more of the plurality of the connected physical actuators that each correspond to one of the one or more proposed device actuators of the proposed device;

translating, by the prototyping system, at least a second portion of the prototype program into a request for a particular, connected physical actuator to execute an action;

translating, by the prototyping system, at least a third portion of the prototyping program into a command for communication with a third party system sending, by the prototyping system and to the sensor hub system and using the prototyping API, each of the one or more registration requests to cause the sensor hub system to a) register a particular, connected physical sensor from the plurality of connected physical sensors for each of the one or more proposed device sensors of the proposed device, and b) register the particular, connected physical actuator from the plurality of connected physical actuators for each of the one or more proposed device actuators of the proposed device;

sending, by the prototyping system to the third party system and using the prototyping API and the command, a communication to the third party system to test the prototype program's communication with the third party system;

receiving, by the prototyping system and from the sensor hub system and using the prototyping API, a status of the particular, connected physical sensor and the particular, connected physical actuator;

after receiving the status, sending, by the prototyping system and to the sensor hub system and using the prototyping API, the request for the connected physical actuator to execute the action; and receiving, by the prototyping system and from the sensor device, a result indicating whether the action succeeded or failed.

2. The method of claim 1, wherein the particular, connected physical sensor and the particular, connected physical actuator are the same component of the sensor hub system.

3. The method of claim 1, comprising:
translating, by the prototyping system, at least a third portion of the prototyping program into a status request; and
sending, by the prototyping system and to the sensor hub system and using the prototyping API, the status request, wherein receiving the status comprises receiving a status response in response to sending the status request.

4. The method of claim 1, comprising:
translating, by the prototyping system, at least a third portion of the prototyping program into a status request for the particular, connected physical sensor from the one or more of the physical sensors that were registered based on the prototyping program; and
sending, by the prototyping system and to the sensor hub system and using the prototyping API, the status request for the particular, connected physical sensor, wherein receiving the status comprises receiving a status response that includes status information for the particular, connected physical sensor in response to sending the status request for the particular, connected physical sensor.

5. The method of claim 1, wherein sending the request for the particular, connected physical actuator to execute the action is responsive to receiving the status of the particular, connected physical sensor, or the particular, connected physical actuator.

6. The method of claim 1, wherein receiving the prototype program that defines functionality of the proposed device comprises receiving the prototype program that defines functionality of a proposed device that is in development.

7. A prototyping system comprising one or more computers and one or more non-transitory computer storage media, including instructions that when executed by the one or more computers cause the one or more computers to perform operations including:
receiving, by a prototyping system that emulates an environment to enable testing for a proposed device and that communicates with a sensor hub system that includes a plurality of connected, physical sensors and a plurality of connected, physical actuators, a prototype program that a) defines functionality of the proposed device that is configured to communicate with one or more proposed device sensors and one or more proposed device actuators and b) comprises statements the prototyping system uses to simulate the proposed device by issuing requests to a prototyping application programming interface (API), the prototyping system comprising one or more computers that include at least one processor and at least one memory;
translating, by the prototyping system, at least a first portion of the prototype program into one or more registration requests for registration of one or more of the connected physical sensors that each correspond to one of the one or more proposed device sensors of the proposed device, and registration of one or more of the plurality of the connected physical actuators that each correspond to one of the one or more proposed device actuators of the proposed device;
translating, by the prototyping system, at least a second portion of the prototype program into a request for a particular, connected physical actuator to execute an action;
translating, by the prototyping system, at least a third portion of the prototyping program into a command for communication with a third party system;
sending, by the prototyping system and to the sensor hub system and using the prototyping API, each of the one or more registration requests to cause the sensor hub system to a) register a particular, connected physical sensor from the plurality of connected physical sensors for each of the one or more proposed device sensors of the proposed device, and b) register the particular, connected physical actuator from the plurality of connected physical actuators for each of the one or more proposed device actuators of the proposed device;
sending, by the prototyping system to the third party system and using the prototyping API and the command, a communication to the third party system to test the prototype program's communication with the third party system;
receiving, by the prototyping system and from the sensor hub system and using the prototyping API, a status of the particular, connected physical sensor and the particular, connected physical actuator;
after receiving the status, sending, by the prototyping system and to the sensor hub system and using the prototyping API, the request for the connected physical actuator to execute the action; and
receiving, by the prototyping system and from the sensor device, a result indicating whether the action succeeded or failed.

8. The prototyping system of claim 7, wherein the particular, connected physical sensor and the particular, connected physical actuator are the same component of the sensor hub system.

9. The prototyping system of claim 7, the operations comprising:
translating, by the prototyping system, at least a third portion of the prototyping program into a status request; and
sending, by the prototyping system and to the sensor hub system and using the prototyping API, the status request, wherein receiving the status comprises receiving a status response in response to sending the status request.

10. The prototyping system of claim 7, the operations comprising:
translating, by the prototyping system, at least a third portion of the prototyping program into a status request for the particular, connected physical sensor from the one or more of the physical sensors that were registered based on the prototyping program; and
sending, by the prototyping system and to the sensor hub system and using the prototyping API, the status request for the particular, connected physical sensor, wherein receiving the status comprises receiving a status response that includes status information for the particular, connected physical sensor in response to sending the status request for the particular, connected physical sensor.

11. The prototyping system of claim 7, wherein sending the request for the particular, connected physical actuator to execute the action is responsive to receiving the status of the particular, connected physical sensor, or the particular, connected physical actuator.

12. The prototyping system of claim 7, wherein receiving the prototype program that defines functionality of the proposed device comprises receiving the prototype program that defines functionality of a proposed device that is in development.

13. A non-transitory computer storage medium encoded with instructions that, when executed by one or more computers, cause the one or more computers to perform operations comprising:

receiving, by a prototyping system that emulates an environment to enable testing for a proposed device and that communicates with a sensor hub system that includes a plurality of connected, physical sensors and a plurality of connected, physical actuators, a prototype program that a) defines functionality of the proposed device that is configured to communicate with one or more proposed device sensors and one or more proposed device actuators and b) comprises statements the prototyping system uses to simulate the proposed device by issuing requests to a prototyping application programming interface (API), the prototyping system comprising one or more computers that include at least one processor and at least one memory;

translating, by the prototyping system, at least a first portion of the prototype program into one or more registration requests for registration of one or more of the connected physical sensors that each correspond to one of the one or more proposed device sensors of the proposed device, and registration of one or more of the plurality of the connected physical actuators that each correspond to one of the one or more proposed device actuators of the proposed device;

translating, by the prototyping system, at least a second portion of the prototype program into a request for a particular, connected physical actuator to execute an action;

translating, by the prototyping system, at least a third portion of the prototyping program into a command for communication with a third party system;

sending, by the prototyping system and to the sensor hub system and using the prototyping API, each of the one or more registration requests to cause the sensor hub system to a) register a particular, connected physical sensor from the plurality of connected physical sensors for each of the one or more proposed device sensors of the proposed device, and b) register the particular, connected physical actuator from the plurality of connected physical actuators for each of the one or more proposed device actuators of the proposed device;

receiving, by the prototyping system and from the sensor hub system and using the prototyping API, a status of the particular, connected physical sensor and the particular, connected physical actuator;

after receiving the status, sending, by the prototyping system and to the sensor hub system and using the prototyping API, the request for the connected physical actuator to execute the action; and receiving, by the prototyping system and from the sensor device, a result indicating whether the action succeeded or failed.

14. The computer storage medium of claim 13, wherein the particular, connected physical sensor and the particular, connected physical actuator are the same component of the sensor hub system.

15. The computer storage medium of claim 13, the operations comprising:

translating, by the prototyping system, at least a third portion of the prototyping program into a status request; and sending, by the prototyping system and to the sensor hub system and using the prototyping API, the status request, wherein receiving the status comprises receiving a status response in response to sending the status request.

16. The computer storage medium of claim 13, the operations comprising:

translating, by the prototyping system, at least a third portion of the prototyping program into a status request for the particular, connected physical sensor from the one or more of the physical sensors that were registered based on the prototyping program; and sending, by the prototyping system and to the sensor hub system and using the prototyping API, the status request for the particular, connected physical sensor, wherein receiving the status comprises receiving a status response that includes status information for the particular, connected physical sensor in response to sending the status request for the particular, connected physical sensor.

17. The computer storage medium of claim 13, wherein sending the request for the particular, connected physical actuator to execute the action is responsive to receiving the status of the particular, connected physical sensor, or the particular, connected physical actuator.

18. The computer storage medium of claim 13, wherein receiving the prototype program that defines functionality of the proposed device comprises receiving the prototype program that defines functionality of a proposed device that is in development.

* * * * *

UNITED STATES PATENT AND TRADEMARK OFFICE
CERTIFICATE OF CORRECTION

PATENT NO. : 11,171,829 B2  
APPLICATION NO. : 16/675345  
DATED : November 9, 2021  
INVENTOR(S) : Fabien Papleux Page 1 of 1

It is certified that error appears in the above-identified patent and that said Letters Patent is hereby corrected as shown below:

In the Claims

In Claim 1, Column 10, Line 46, delete "system" and insert -- system; --, therefor.

In Claim 7, Column 11, Line 47, delete "a" and insert -- the --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*